US008832107B2

(12) United States Patent  (10) Patent No.: US 8,832,107 B2
Sachs  (45) Date of Patent: Sep. 9, 2014

(54) COLLECTION AND CATEGORIZATION OF CONFIGURATION DATA

(75) Inventor: Marco Sachs, St. Leon-Rot (DE)

(73) Assignee: SAP AG, Walldorf (DE)

( * ) Notice: Subject to any disclaimer, the term of this patent is extended or adjusted under 35 U.S.C. 154(b) by 62 days.

(21) Appl. No.: 13/426,111

(22) Filed: Mar. 21, 2012

(65) Prior Publication Data

US 2013/0254200 A1   Sep. 26, 2013

(51) Int. Cl.
*G06F 7/00* (2006.01)
*G06F 17/30* (2006.01)

(52) U.S. Cl.
CPC ............................ *G06F 17/30368* (2013.01)
USPC ........................................................ 707/737

(58) Field of Classification Search
None
See application file for complete search history.

(56) References Cited

U.S. PATENT DOCUMENTS

| 2008/0282181 | A1* | 11/2008 | Ferguson | 715/771 |
|---|---|---|---|---|
| 2009/0138843 | A1* | 5/2009 | Hinton et al. | 717/101 |
| 2009/0300416 | A1* | 12/2009 | Watanabe et al. | 714/19 |
| 2010/0121877 | A1* | 5/2010 | Fawcett et al. | 707/769 |
| 2011/0087672 | A1* | 4/2011 | Hui et al. | 707/748 |

* cited by examiner

*Primary Examiner* — Jay Morrison
(74) *Attorney, Agent, or Firm* — Schwegman Lundberg & Woessner, P.A.

(57) ABSTRACT

In an embodiment, a method is provided for collecting configuration data. In this example, configuration data associated with an application is searched. Additionally, metadata associated with the configuration data is searched. Changes made to the configuration data are detected, and the changes and associated metadata are stored in a storage device. The changes are then categorized based on the metadata.

22 Claims, 7 Drawing Sheets

FIG. 6

COLLECTION AND CATEGORIZATION OF CONFIGURATION DATA

FIELD

The present disclosure relates generally to data mining. In an embodiment, the disclosure relates to collection and categorization of configuration data.

BACKGROUND

Enterprise systems are large-scale application software packages that support various business processes, information flows, reporting, and data analytics in organizations. For example, an enterprise system can include a financial module that provides a common platform for the capture of financial data, such as basic accounting transactions, across numerous business units in real time. The enterprise system can also include, for example, a corporate services module that provides a variety of corporate functions, such as project portfolio management, quality management, and travel and safety compliance.

When deploying an enterprise system, an organization needs to design and configure the enterprise system according to its business practices. It should be appreciated that a variety of different aspects of the enterprise system can be configured. For example, an organization can configure the financial module to provide automatic payments functionality. In another example, an organization can design and setup the corporate services module to provide different reports. An organization needs to carefully design and set up an enterprise system to make sure that every part of the enterprise system precisely describes and tracks the way the organization works. However, the setup of an enterprise system can be labor intensive and complicated, and often, the organization needs to hire a special consultant to design and set up the enterprise system.

BRIEF DESCRIPTION OF DRAWINGS

The present disclosure is illustrated by way of example and not limitation in the figures of the accompanying drawings, in which like references indicate similar elements and in which:

FIG. 6 is an example embodiment of an authoring graphical user interface; and

DETAILED DESCRIPTION

The description that follows includes illustrative systems, methods, techniques, instruction sequences, and computing machine program products that embody illustrative embodiments of the present invention. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures and techniques have not been shown in detail.

Figure 1:
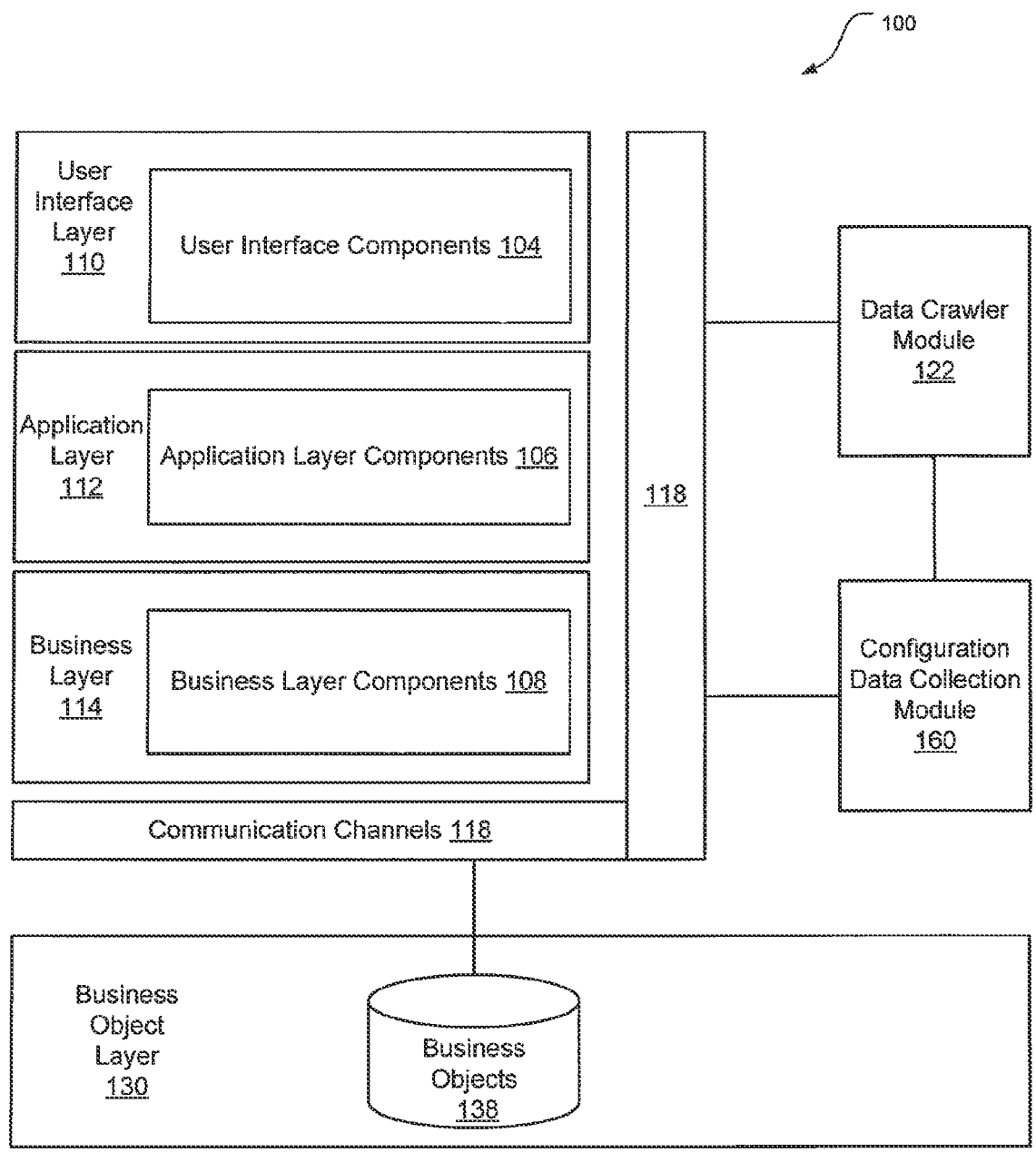
FIG. 1 is an architecture diagram depicting an enterprise system, in accordance with an example embodiment.

FIG. 1 is an architecture diagram depicting an enterprise system 100, in accordance with an example embodiment. This example of the enterprise system 100 has a service oriented architecture that includes a user interface layer 110, an application layer 112, a business layer 114, a data crawler module 122, a configuration data collection module 160, and a business object layer 130. The different layers 110, 112, and 114 communicate with the data crawler module 122, the configuration data collection module 160, and the business object layer 130 by way of communication channels 118. Additionally, each set of component (e.g., user interface components 104, application layer components 106, or business layer components 108) can access business objects 138 or other resources stored in the business object layer 130.

In general, a service oriented architecture provides business services by orchestrating a set of loosely coupled technical services, such as the user interface components 104, the application layer components 106, and the business layer components 108. Examples of systems that provide such business services include an enterprise resource planning (ERP) system and a customer relationship management (CRM) system (collectively referred to as an "ERP/CRM" system). Generally, the ERP/CRM system manages customer accounts for an enterprise. For example, the ERP/CRM system tracks outstanding balances, generates notices to customers based on overdue payments, generates invoices to customers for payments due or provides invoicing data to, for example, a service billing system so that the service billing system may generate the actual invoices for sending to customers. Additionally, the ERP/CRM system may perform other tasks associated with a customer's account. To perform these tasks, the ERP/CRM system may include rules or logic used to implement a task based on, for example, billing data received from service billing system for a particular customer. The ERP/CRM system may thus be a type of software application system that provides one or more services, such as generating customer records and managing customer accounts based on billing data included within the customer records. The services may be accessible to other parts of the ERP/CRM system through a communication mechanism, such as communication channels 118.

The data crawler module 122 is a type of search engine that is configured to collect configuration data and metadata associated with the configuration data from the user interface layer 110, application layer 112, and business layer 114. As used herein, "configuration data" refers to data that is used to configure and setup the system 100. Examples of configuration data include configuration data that control the behavior of the user interface (e.g. user interface settings for different user roles or processes) and control behavior of processes (e.g., process settings), a set of restrictions user restrictions in user management), selection or activation of new functionality, and deselection or deactivation of features.

Metadata associated with the configuration data refers to data about the configuration data. Examples of metadata include descriptions of the configuration data, such as time, industry area, number of employees, groups of settings, organization structure, and other metadata. It should be noted that configuration data and its associated metadata are different from transactional data that is maintained by, for example, a customer, either by way of migration from legacy systems or manual input, such as employee details (e.g., name, address, and salary), orders, opportunities, materials, prices, and other transactional data. Configuration data is mainly stored in the application layer 112, but can also be stored in the user interface layer 110, business layer 114, and even the business object layer 130.

Still referring to FIG. 1, the configuration data collection module 160 is configured to classify the configuration data collected from the data crawler module 122. As explained in more detail below, the configuration data collection module 160 can classify the configuration data based on the collected metadata.

In one embodiment, the system 100 can be located in a cloud computing environment. Generally, cloud computing is a model for enabling on-demand network access to a shared pool of configurable computing resources e.g., networks, servers, storage, applications, and services) that can be provisioned and released with minimal management effort or service provider interaction. The cloud computing environment can include applications and enterprise services. The applications running on the cloud infrastructure (e.g., application layer components 106) are accessible from various client platforms through thin client interfaces, such as Web browsers. In the cloud computing environment, each application relies on one or more enterprise services, which refer to the underlying structure supporting communications among units of work (also referred to as services) executed on behalf of the applications. The services provided by the enterprise applications are pooled to serve multiple applications and client platforms with different physical and virtual resources dynamically assigned and reassigned according to user demand.

Figure 2:
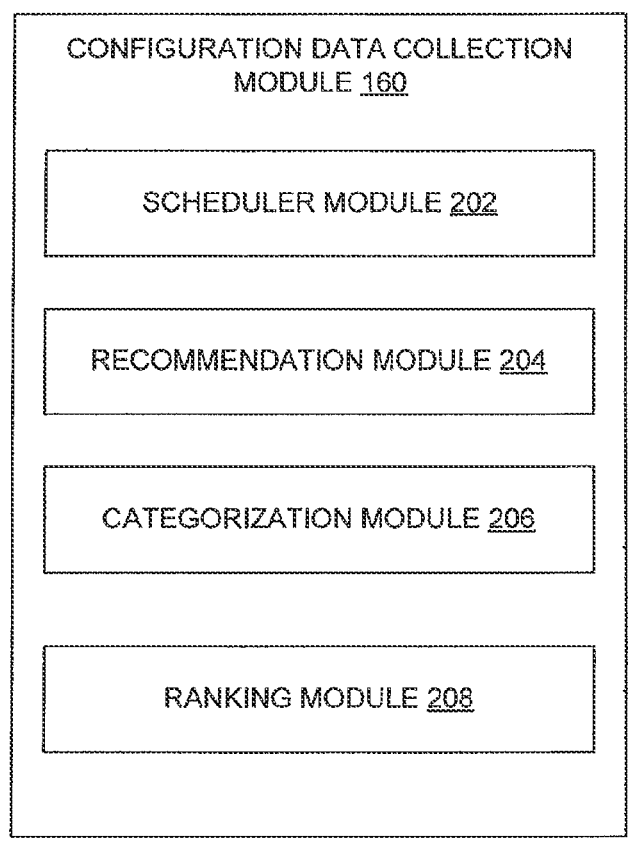
FIG. 2 is a block diagram depicting a configuration data collection module, in accordance with an example embodiment.

FIG. 2 is a block diagram depicting a configuration data collection module 160, in accordance with an example embodiment. The configuration data collection module 160 may be included in, for example, the system 100 depicted in FIG. 1. In various embodiments, the configuration data collection module 160 may be used to implement computer programs, logic, applications, methods, processes, or software to collect and categorize configuration data, as described in more detail below.

In the embodiment depicted in FIG. 2, the configuration data collection module 160 includes a scheduler module 202, a recommendation module 204, a categorization module 206, and a ranking module 208. As discussed previously, a data crawler module is configured to extract configuration data and its associated metadata. The scheduler module 202 can provide a schedule to which the data crawler module is to crawl or collect the configuration data and its metadata. For example, the scheduler module 202 can make requests to the data crawler module to crawl for configuration data periodically.

The categorization module 206 is configured to categorize the configuration data using a variety of different transformation techniques. For example, as explained in more detail below, the configuration data can be categorized based on its metadata.

The ranking module 208 is configured to rank the configuration data. As explained in more detail below, the ranking can be based on a number of occurrences of each configuration datum. After the configuration data is categorized and ranked, the recommendation module 204 can provide various recommendations regarding the collected configuration data. The recommendation can be made using a variety of different types of analysis. For example, in one embodiment, the recommendation module can make recommendations based on the rankings, the details of which are described in detail below.

It should be appreciated that in other embodiments, the configuration data collection module 160 may include fewer or more modules apart from those shown in FIG. 2. For example, in an alternate embodiment, configuration data collection module 160 can include a data crawler module that is configured to collect both configuration data and metadata. The modules 202, 204, 206, and 208 may be in the form of software that is processed by a processor. In another example, as explained in more detail below, the modules 202, 204, 206, and 208 may be in the form of firmware that is processed by application specific integrated circuits (ASIC), which may be integrated into a circuit board. Alternatively, the modules 202, 204, 206, and 208 may be in the form of one or more logic blocks included in a programmable logic device (for example, a field programmable gate array). The described modules 202, 204, 206, and 208 may be adapted, and/or additional structures may be provided, to provide alternative or additional functionalities beyond those specifically discussed in reference to FIG. 2. Examples of such alternative or additional functionalities will be discussed in reference to the flow diagrams discussed below.

Figure 3:
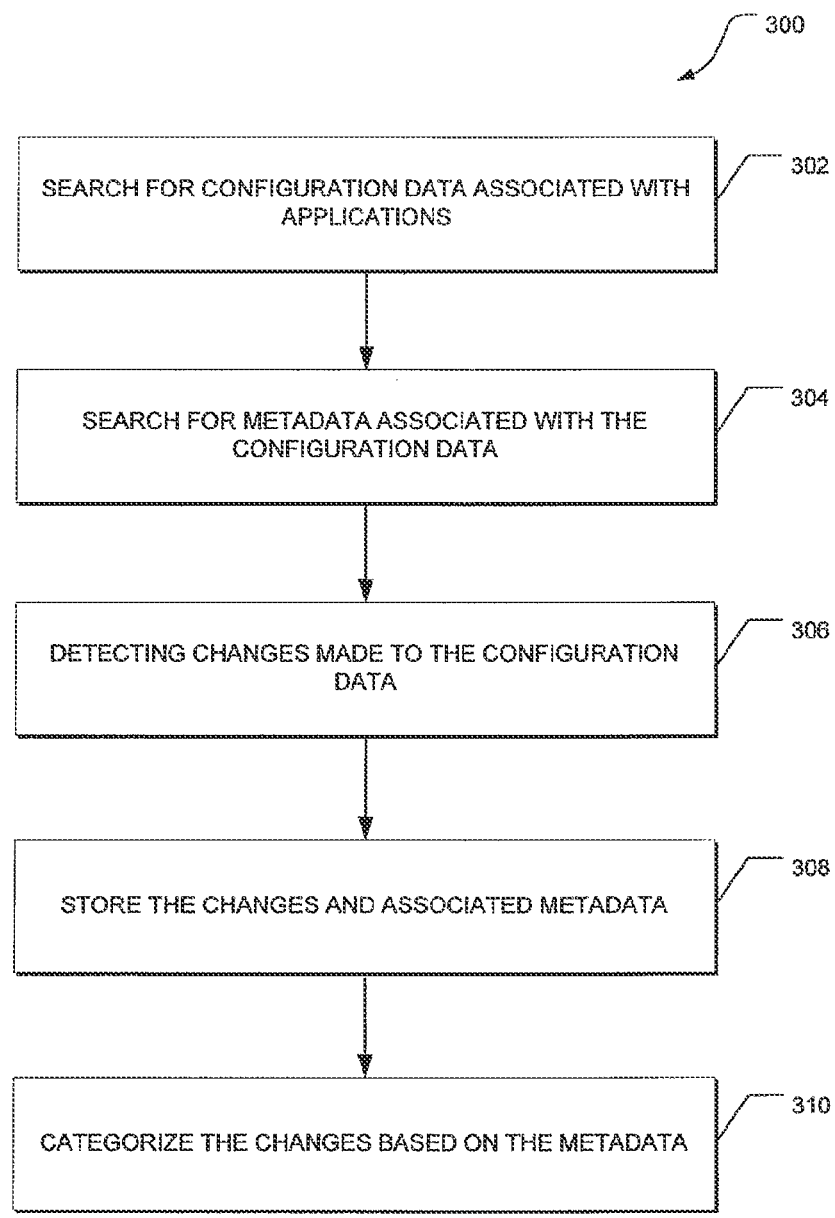
FIG. 3 is a flow diagram of a general overview of a method, in accordance with an example embodiment, for collecting and categorizing configuration data.

FIG. 3 is a flow diagram depicting a general overview of a method 300, in accordance with an example embodiment, for collecting and categorizing configuration data. In an example embodiment, the method 300 may be implemented by the configuration data collection module 160 and the data crawler module 122 depicted in FIGS. 2 and 1, respectively. In the embodiment depicted in FIG. 3, the data crawler module, at 302, searches for and collects configuration data associated with various applications. Additionally, the data crawler module, at 304, also searches for and collects metadata associated with the configuration data.

With the configuration data and associated metadata collected, the configuration data collection module, at 306, is configured to detect changes made to any of the configuration data. A "change" to configuration data, as used herein, refers to a variation or deviation between at least two sets of the same configuration data. In one example, the change can be detected by comparing at least two sets of the same configuration data collected at different times. An example of a change is the difference between two numbers. For example, a difference between a first threshold value of 10 (a type of configuration data) and a second threshold value of 4 results in a difference of 6. Other examples of changes can include changes to selection or deselection of some settings, functions, features, and processes, addition of process steps into a process, activation of visual elements like buttons (e.g., changing visibility), and adjustment to processes (flow A change to flow B or to Flow A1), The configuration data collection module then stores the detected changes and their associated metadata, at 308, in a storage device, which, in some embodiments, can be located in a cloud computing system. At 310, the configuration data collection module then categorizes the changes based on the metadata. As explained in more detail below, the changes can be grouped or categorized based on each type of metadata. The categorized changes can be used for a variety of different data analyses. For example, as explained in detail below, the configuration data collection module can analyze the changes to make a recommendation of specific configuration changes to make to an application based on a user's needs.

Figure 4:
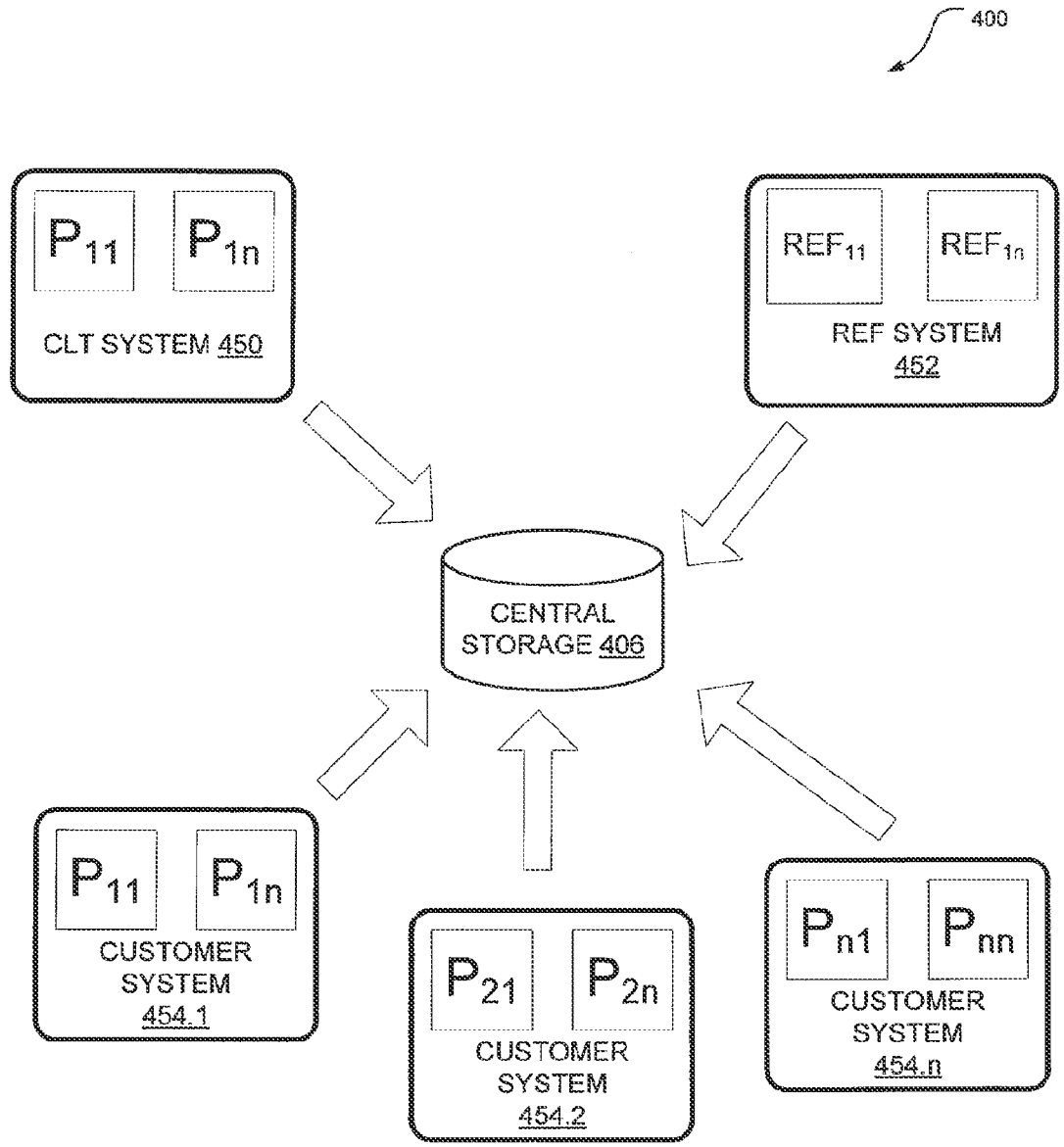
FIG. 4 is a diagram of a system depicting the collection of configuration data in central storage, in accordance with an example embodiment.

FIG. 4 is a diagram of a system 400 depicting the collection of configuration data in a central storage, in accordance with an example embodiment. As depicted, the system 400 includes various systems from where the configuration data and associated metadata can be collected, such as a consolidated labor laws (CLT) system 450, a general information and reference (REF) system 452, and various customer systems 454.1, 454.2 . . . 454.n. The systems 450, 452, and 454.1, 454.2 . . . 454.n can be used by a number of different organizations. There are a variety of types of organizations, such as corporations, governments, non-governmental organizations, international organizations, armed forces, charities, not-for-profit corporations, partnerships, cooperatives, and universities. In one example, each customer systems 451 can be used by different corporations. As a result, configuration data associated with different organizations can be collected, as explained in detail below.

The data crawler module, for example, can search for and collect various data from each system 450, 452, and 454.1-454.n, such as project "P" data and reference "REF" data. The data crawler module or the configuration data collection module can extract configuration data from the collected P and REF data. Examples of such configuration data can include attributes of the P data and REF data, such as activity lists and implementation status (e.g., draft and finished). Additionally, the data crawler module can search for and collect metadata associated with the configuration data. The metadata can be extracted from the P and REF data or from other locations in systems 450, 452, and 454.1-454.n. The data crawler module can then store all the collected configuration data and associated metadata in a central storage 406 located in, for example, a cloud computing system.

Figure 5:
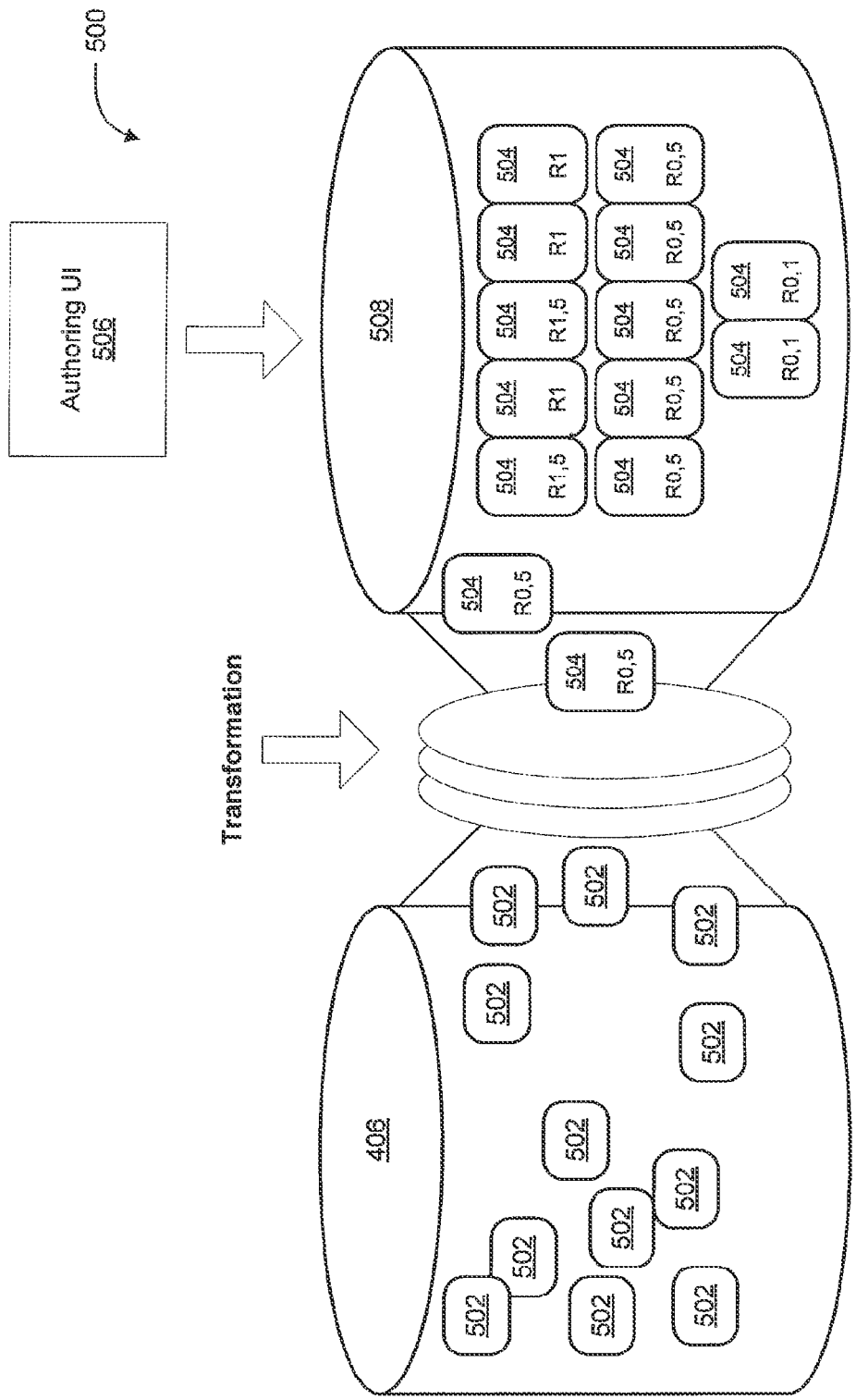
FIG. 5 is a diagram of a system depicting the categorization and ranking of configuration data, in accordance with an example embodiment.

FIG. 5 is a diagram of a system 500 depicting the categorization and ranking of configuration data, in accordance with an example embodiment. After the changes made to configuration data and associated metadata (collectively known as "collected data" 502) are stored in the central storage 406, a categorization module can apply a variety of transformation functions to the collected data 502 to categorize the changes. Examples of transformation functions that can be applied to the collected data 502 for categorization include binary relevance transformation, label combinations transformation, chain classifiers, multi-label k-nearest neighbor classifiers, and other transformation functions.

In one embodiment, the changes can be categorized based on using each type of metadata as a category. In other words, each type of metadata can be assigned or defined as a single category, and a categorization module can group the changes to each respective category. For example, metadata describing a particular configuration datum as a "date" field can be used as a category. As such, all changes made to dates can be grouped into the "date" category. In another example, metadata describing "personnel type" can be used as a category, and all changes made to personnel type data can be grouped into the "personnel type" category. The categorized changes are stored in the scenario storage 508. Additionally, in one embodiment, the configuration data can also be stored in the scenario storage 508. Here, the configuration data can also be categorized base on using each type of metadata as a category.

In addition to categorization, the configuration data collection module can also rank each categorized change. For example, as depicted in FIG. 5, each category 504 can be assigned a ranking "R." In one embodiment, each category can be ranked based on a number of occurrences of a particular change. For example, a specific type of "personnel type" change occurs 25 times in the central storage 406. However, a different type "date" change occurs only twice in the central storage 406. A ranking module may therefore rank the "personnel type" change to be higher than the "date" change because the "personnel type" change occurs more frequently than the "date" change.

Figure 6:
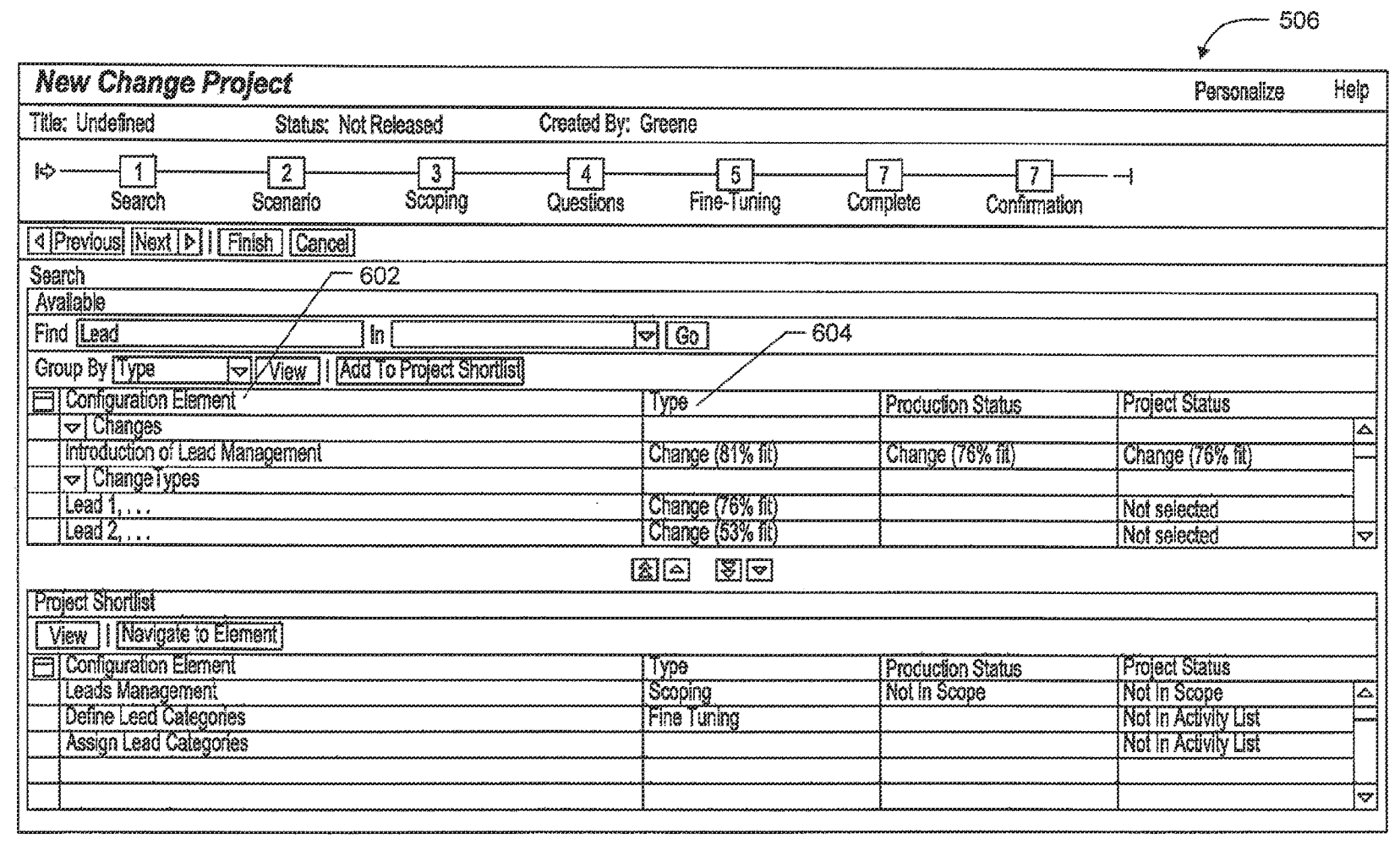

After changes to configuration data are categorized and stored in the scenario storage 508, the changes can be used for a variety of analyses. For example, in one embodiment, the changes can be analyzed to provide a recommendation, which can be displayed by way of an authoring graphical user interface 506. FIG. 6 depicts an example embodiment of an authoring graphical user interface 506. Here, the authoring graphical user interface 506 includes a column 602 that lists the changes made to configuration data and additionally includes columns that provide recommendations, such as type column 604. The recommendation is made based on the rankings of the categorized changes. In the example depicted in FIG. 6, a recommendation module can identify the top ranked change in each category (or highest ranked categorized change) and list the descriptions of the changes and their respective rankings in columns 602 and 604, respectively. A user can apply a particular configuration change by selecting one of the fields in column 602.

In addition to recommendations, other analysis techniques that may be applied include analysis by region or industry, where changes made by users can be grouped by region or industry. Yet another analysis technique can relate to key performance index where the changes can be correlated to a key performance index. This analysis can basically reveal how each change can affect one or more key performance indexes.

Figure 7:
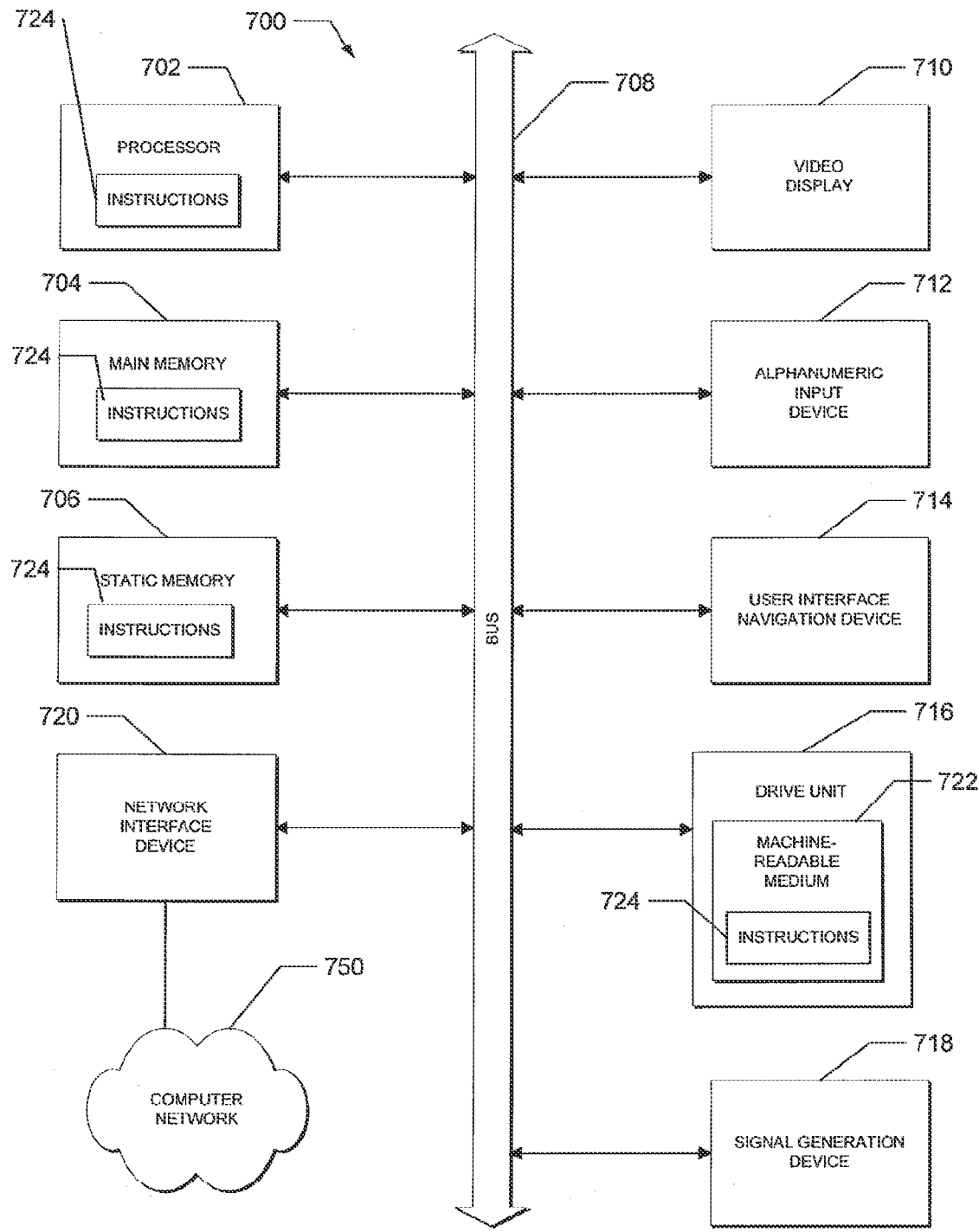
FIG. 7 is a block diagram of a machine in the example form of a processing system within which may be executed a set of instructions for causing the machine to perform any one or more of the methodologies discussed herein.

FIG. 7 depicts a block diagram of a machine in the example form of a processing system 700 within which may be executed a set of instructions for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment.

The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the processing system 700 includes a processor 702 (e.g., a central processing unit (CPU), a graphics processing unit (GPU) or both), a main memory 704 (e.g., random access memory), and static memory 706 (e.g., static random-access memory), which communicate with each other via bus 708. The processing system 700 may further include video display unit 710 (e.g., a plasma display, a liquid crystal display (LCD) or a cathode ray tube (CRT)). The processing system 700 also includes an alphanumeric input device 712 (e.g., a keyboard), a user interface (UI) navigation device 714 (e.g., a mouse), a disk drive unit 716, a signal generation device 718 (e.g., a speaker), and a network interface device 720.

The disk drive unit 716 (a type of non-volatile memory storage) includes a machine-readable medium 722 on which is stored one or more sets of data structures and instructions 724 (e.g., software) embodying or utilized by any one or more of the methodologies or functions described herein. The data structures and instructions 724 may also reside, completely or at least partially, within the main memory 704 and/or within the processor 702 during execution thereof by processing system 700, with the main memory 704 and processor 702 also constituting machine-readable, tangible media.

The data structures and instructions 724 may further be transmitted or received over a computer network 750 via network interface device 720 utilizing any one of a number of well-known transfer protocols (e.g., HyperText Transfer Protocol (HTTP)).

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., the processing system 700) or one or more hardware modules of a computer system (e.g., a processor 702 or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor 702 or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor 702 configured using software, the general-purpose processor 702 may be configured as respective different hardware modules at different times. Software may accordingly configure a processor 702, for example, to constitute a particular hardware module at one instance of time and to constitute a different hardware module at a different instance of time.

Modules can provide information to, and receive information from, other modules. For example, the described modules may be regarded as being communicatively coupled. Where multiples of such hardware modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

The various operations of example methods described herein may be performed, at least partially, by one or more processors 702 that are temporarily configured (e.g., by software) or permanently configured to perform the relevant operations. Whether temporarily or permanently configured, such processors 702 may constitute processor-implemented modules that operate to perform, one or more operations or functions. The modules referred to herein may, in some example embodiments, comprise processor-implemented modules.

Similarly, the methods described herein may be at least partially processor-implemented. For example, at least some of the operations of a method may be performed by one or more processors 702 or processor-implemented modules. The performance of certain of the operations may be distributed among the one or more processors 702, not only residing within a single machine, but deployed across a number of machines. In some example embodiments, the processors 702 may be located in a single location (e.g., within a home environment, an office environment or as a server farm), while in other embodiments the processors 702 may be distributed across a number of locations.

While the embodiment(s) is (are) described with reference to various implementations and exploitations, it will be understood that these embodiments are illustrative and that the scope of the embodiment(s) is not limited to them. In general, techniques for collecting and categorizing configuration data may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the embodiment(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the embodiment(s).

What is claimed is:

1. A method of collecting configuration data, the method comprising:
    searching for configuration data associated with an application;
    searching for metadata associated with the configuration data;
    detecting a change made to at least one of the configuration data;
    storing the change and associated metadata in a storage device, the associated metadata corresponding to the at least one of the configuration data associated with the change;
    categorizing the change based on the metadata;
    identifying a number of occurrences of the categorized change;

assigning a rating to the categorized change, the rating being based on the number of occurrences of the categorized change; and using the rating to assign a ranking to the categorized change relative to at least one additional categorized change, the ranking based on relative frequencies of the categorized changes.

2. The method of claim 1, wherein the detection of the change comprises comparing at east two sets of the same configuration data collected at different times.

3. The method of claim 1, further comprising:
identifying a number of occurrences of the at least one of the configuration data; and
assigning a configuration-data rating to the change based on the identified number of occurrences of the at least one of the configuration data.

4. The method of claim 1, wherein each metadatum is defined as a category, and wherein the categorization comprises grouping the change to at least one category.

5. The method of claim 1, wherein the configuration data defines a setup of an application.

6. The method of claim 1, wherein the storage device is located in a cloud computing system.

7. The method of claim 1, wherein the categorization of the change includes grouping the change into a category defined by one or more metadata values.

8. An enterprise system comprising:
a number of enterprise applications;
a data crawler module in communication with the number of enterprise applications, the data crawler module having instructions that cause operations to be performed, the operations comprising:
searching for configuration data associated with the number of enterprise applications; and
searching for metadata associated with the configuration data; and
a configuration data collection module in communication with the number of enterprise applications, the configuration data collection module having instructions that cause operations to be performed, the operations comprising:
detecting a change made to at least one of the configuration data;
storing the change and associated metadata in a storage device, the associated metadata corresponding to the at least one of the configuration data associated with the change;
categorizing the change based on the metadata;
identifying a number of occurrences of the categorized change;
assigning a rating to the categorized change, the rating being based on the number of occurrences of the categorized change; and
using the rating to assign a ranking to the categorized change relative to at least one additional categorized change, the ranking being based on relative frequencies of the categorized changes.

9. The enterprise system of claim 8, wherein the operation of detecting the change comprises comparing at least two sets of the same configuration data collected at different times.

10. The enterprise system of claim 8, wherein the configuration data collection module having instructions that cause operations to be performed, the operations further comprising:
identifying a number of occurrences of the at least one of the configuration data; and
assigning a configuration-data rating to the change based on the identified number of occurrences of the at least one of the configuration data.

11. The enterprise system of claim 8, wherein each metadatum is defined as a category, and wherein the categorization comprises grouping the change to at least one category.

12. The enterprise system of claim 8, wherein the configuration data defines a setup of an application.

13. The enterprise system of claim 8, wherein the number of enterprise applications is located in an application layer of a cloud computing system.

14. The enterprise system of claim 8, wherein the number of enterprise applications are associated with different organizations.

15. A non-transitory, machine-readable storage medium that stores instructions, which, when performed by a machine, cause the machine to perform operations comprising:
searching for configuration data associated with an application;
searching for metadata associated with the configuration data;
detecting a change made to at least one of the configuration data;
storing the change and associated metadata in a storage device, the associated metadata corresponding to the at least one of the configuration data associated with the change;
categorizing the change based on the metadata;
identifying a number of occurrences of the categorized change;
assigning a rating to the categorized change, the rating being based on the number of occurrences of the categorized change; and
using the rating to assign a ranking to the categorized change relative to at least one additional categorized change, the ranking being based on relative frequencies of the categorized changes.

16. The non-transitory, machine-readable storage medium of claim 15, wherein the operation of detecting the change comprises comparing at least two sets of the same configuration data collected at different times.

17. The non-transitory, machine-readable storage medium of claim 15, wherein the instructions further cause the machine to perform operations comprising:
identifying a number of occurrences of the at least one of the configuration data; and
assigning a configuration-data rating to the change based on the identified number of occurrences of the at least one of the configuration data.

18. The non-transitory, machine-readable storage medium of claim 15, wherein each metadatum is defined as a category, and wherein the categorization comprises grouping the change to at least one category.

19. The non-transitory, machine-readable storage medium of claim 15, wherein the configuration data defines a setup of an application.

20. The non-transitory, machine-readable storage medium of claim 15, wherein the application is located in an application layer of a cloud computing system.

21. The non-transitory, machine-readable storage medium of claim 15, the operations further comprising storing the configuration data in the storage device.

22. The non-transitory, machine-readable storage medium of claim 15, wherein the categorization of the change includes grouping the change into a category defined by one or more metadata values.

* * * * *